May 1, 1923.

T. J. ELLISON

ANIMAL TRAP

Filed Nov. 1, 1922

Inventor:
Thomas J. Ellison.

By Milo B. Stevens & Co.

Attorneys

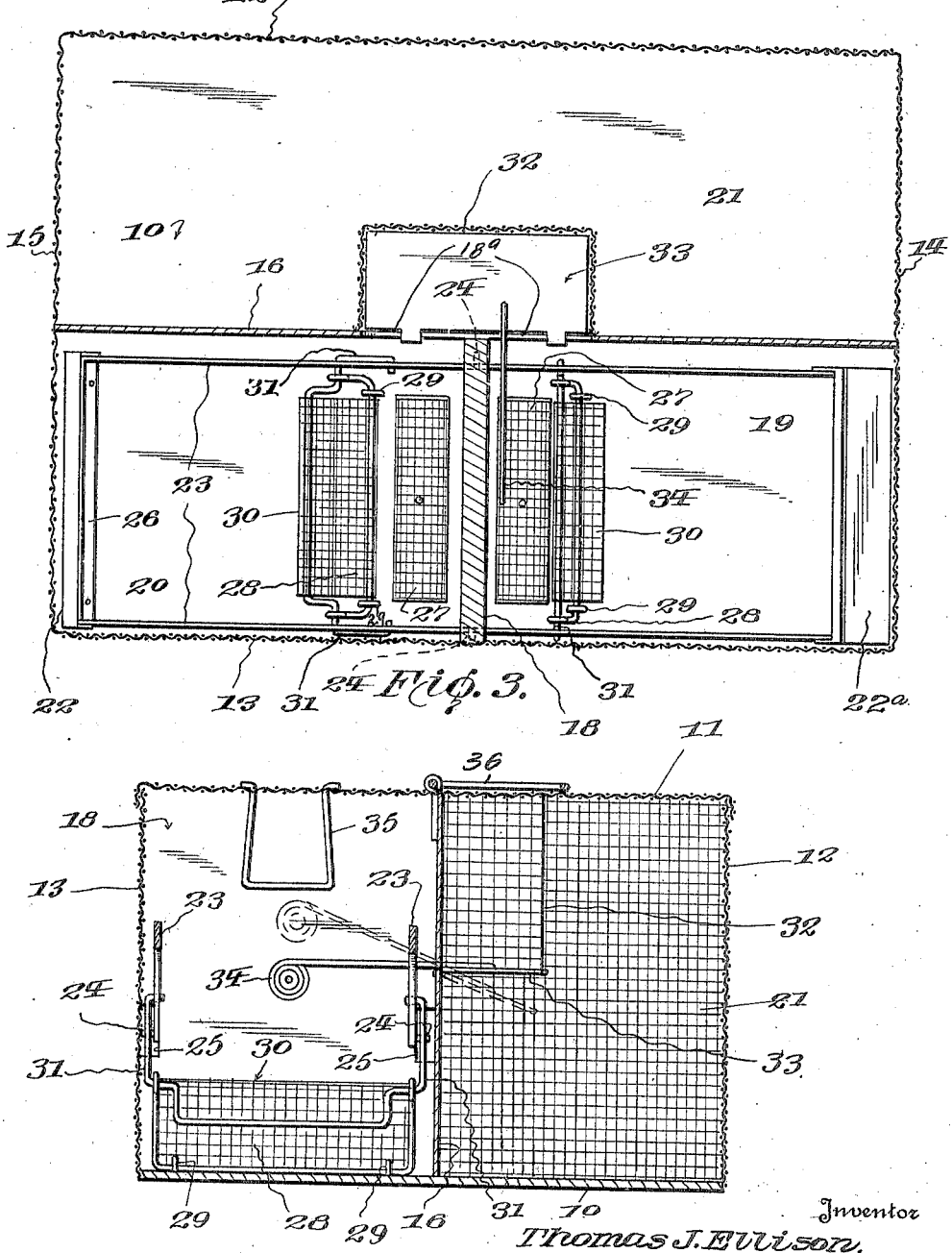

Patented May 1, 1923.

1,453,342

UNITED STATES PATENT OFFICE.

THOMAS J. ELLISON, OF RICHMOND, KENTUCKY.

ANIMAL TRAP.

Application filed November 1, 1922. Serial No. 598,416.

*To all whom it may concern:*

Be it known that I, THOMAS J. ELLISON, a citizen of the United States, residing at Richmond, in the county of Madison and State of Kentucky, have invented new and useful Improvements in Animal Traps, of which the following is a specification.

This invention relates to animal traps which are reset by each victim entering the same, so that the trap may be in condition to catch the next victim.

The invention has for its object to provide a simple and very efficient trap of the kind stated, and to this end it consists in a novel combination and arrangement of parts to be hereinafter described and claimed.

In order that the invention may be better understood, reference is had to the accompanying drawings, wherein—

Fig. 3 is a horizontal section on the line 3—3 of Fig. 1, and

Fig. 4 is a cross-section on the line 4—4 of Fig. 1.

Figure 1:
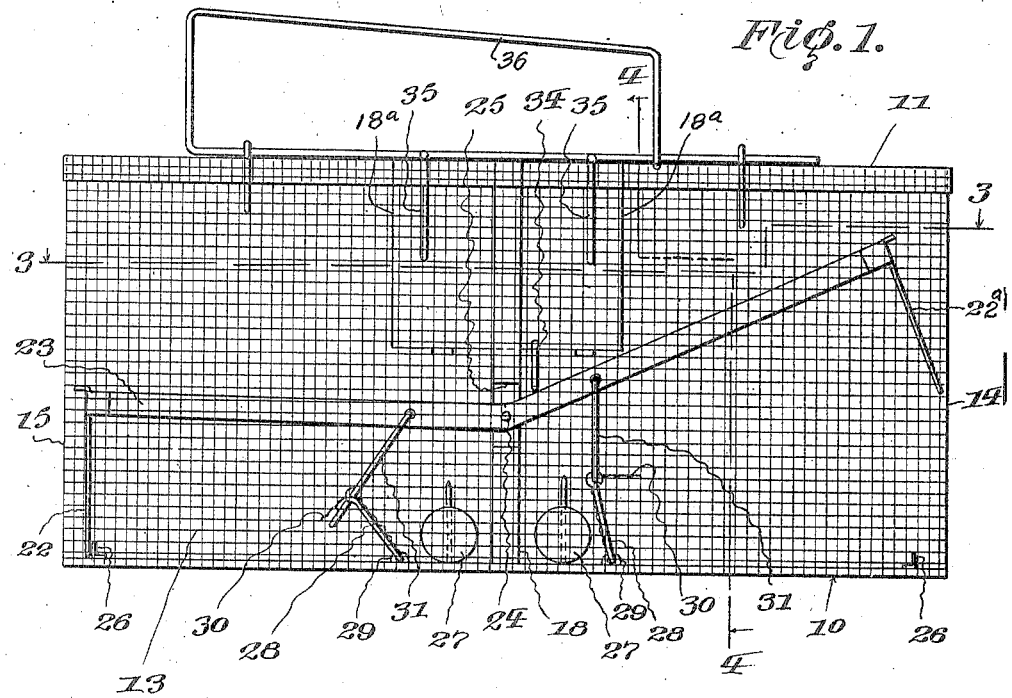
Figure 1 is a side elevation of the trap.
Figure 2:
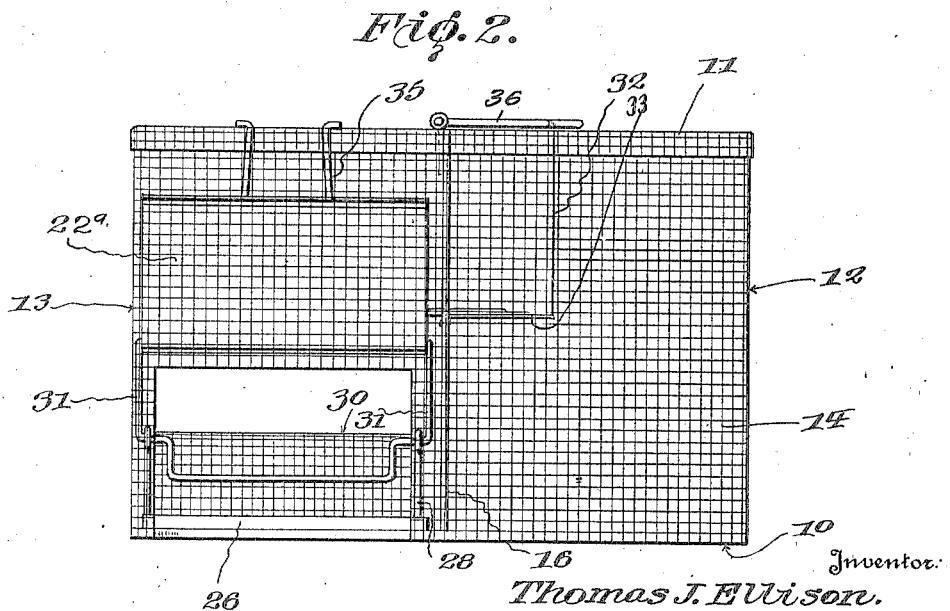
Fig. 2 is an end view thereof.

In carrying out the invention, I provide an enclosure having its top and side walls formed of some suitable reticulated material, such as screen fabric, or the like. The enclosure has a wooden or other suitable floor or bottom 10, and its top 11 is removable for access to the interior of the enclosure. The side walls are denoted by the reference characters 12 and 13, and the end walls by the reference characters 14 and 15.

The enclosure has, intermediate its side walls 12 and 13, a longitudinal partition 16 which may be a piece of sheet metal. This partition divides the enclosure into two compartments, the one on one side of the partition being an entrance compartment which is divided by a transverse wooden partition 18 into two sections 19 and 20 which are separate and do not communicate. The compartment 21 on the other side of the partition 16 is a victim chamber, the victims passing into the same from the entrance compartments 19 and 20.

Entrance to the compartment 19 is had through a doorway or opening in the end wall 14, and to the compartment 20 through a doorway or opening in the end wall 15. These two entrances are controlled by gates 22 and 22ª which operate alternately, so that when one swings closed, the other swings open. In order that this action may take place, the gates are carried by the outer ends of a pair of laterally spaced supporting beams 23 which are pivoted, intermediate their ends, at 24, in recesses 25 in the ends of the partition 18. Mounted on the floor 10 so as to extend across the doorways or entrance openings is an upstanding guard strip 26 in front of which the bottom of the gates seat when closed.

In the compartments 19 and 20 are bait receptacles 27, the same being mounted on the floor 10, close to the partition 18. In front of each bait receptacle 27 is a tiltable barrier 28 which extends across the compartment and is pivoted to the floor 10 by means of loops 29 so that it may swing vertically. The top of the barrier has a forwardly extending portion 30, and is connected by rods 31 to the beams 23, the rods of the respective barriers being connected to the beams on opposite sides of their fulcrum 24.

In the partition 16, at the top thereof, are openings 18ª, one on each side of the partition 18, for the escape of the animals from the compartments 19 and 20 into the chamber 21. These openings lead into an enclosure or passageway 32 the bottom of which is a tiltable platform 33 provided with a counterweight 34. This platform is located to precipitate the animals into the chamber 21.

The trap is initially set by swinging the beam 23 to bring one of the gates carried by said beam to closed position, the other gate being left elevated or open. Fig. 1 of the drawings shows the gate 22ª open and the gate 22 closed. An animal attracted by the bait in the compartment 19 can now enter the same, but the compartment 20 cannot be entered as its gate 22 is closed. The animal entering the compartment 19 and attempting to climb over the barrier 28 in said compartment to get at the bait in the holder 27, presses down on the top lateral extension 30, which causes said barrier to tilt back in a direction to tilt the beams 23, the tilting of said beams being occasioned by the connections 31 with the barrier. The beams 23 are tilted in a direction to lower the gate 22ª, whereupon the escape of the animal from the compartment 19 is cut off, and at the same time the gate 22 of the compartment 20 is swung open, so that the next victim may enter the trap by the way of this compartment. The two compartments 19 and 20 are therefore alternately made ready to receive a victim. The victim trapped in either compartment in seeking to escape therefrom climbs through the corresponding openings 18ª into the passageway 32 leading from the compartment, and upon stepping on the platform 33, the latter tilts and precipitates the animal into the receiving chamber 21. At the top of the compartments 19 and 20 may be bait holders 35 to attract the animal to the passageway 32. The trap is provided with a handle or bail 36 to suitably connected to the top thereof.

I claim:

1. An animal trap comprising an enclosure having separate entrance compartments and a victim-receiving chamber, entrance gates for the entrance compartments, a pivoted beam to the ends of which the gates are connected for alternate operation, a tiltable victim-actuated member in each entrance compartment and having an operative connection with the aforesaid pivoted beam, a passageway leading from the entrance compartments to the victim-receiving chamber, and means for preventing the return of the animal from said chamber to the entrance compartments.

2. An animal trap comprising an enclosure having separate entrance compartments and a victim-receiving chamber, entrance gates for the entrance compartments, a pivoted beam to the ends of which the gates are connected for alternate operation, a tiltable victim-actuated member in each entrance compartment and having an operative connection with the aforesaid pivoted beam, a bait-holder behind said member, a passageway leading from the entrance compartments to the victim-receiving chamber, and means for preventing the return of the animal from said chamber to the entrance compartments.

3. An animal trap comprising an enclosure having separate entrance compartments and a victim-receiving chamber, entrance gates for the entrance compartments, a pivoted beam to the ends of which the gates are connected for alternate operation, a tiltable victim-actuated member in each entrance compartment and having an operative connection with the aforesaid pivoted beam, a passageway leading from the entrance compartments to the victim-receiving chamber, bait-holders at the entrance end of said passageway, and means for preventing the return of the animal from said chamber to the entrance compartments.

4. An animal trap comprising an enclosure having separate entrance compartments and a victim-receiving chamber, entrance gates for the entrance compartments, a pivoted beam to the ends of which the gates are connected for alternate operation, a bait-holder in each entrance compartment, tiltable barriers in front of the bait-holders and having operative connection with the beams, a passageway leading from the entrance compartments to the victim-receiving chamber, and means for preventing the return of the animal from said chamber to the entrance compartments.

5. An animal trap comprising an enclosure having separate entrance compartments and a victim-receiving chamber, entrance gates for the entrance compartments, a pivoted beam to the ends of which the gates are connected for alternate operation, a bait-holder in each entrance compartment, tiltable barriers in front of the bait-holders and having operative connection with the beams each of said barriers having a forwardly extending top portion for engagement by a victim, a passageway leading from the entrance compartments to the victim-receiving chamber, and means for preventing the return of the animal from said chamber to the entrance compartments.

In testimony whereof I affix my signature.

THOMAS J. ELLISON.